(12) United States Patent
Medvinsky et al.

(10) Patent No.: US 8,589,674 B2
(45) Date of Patent: Nov. 19, 2013

(54) REVOCATION LIST UPDATE FOR DEVICES

(75) Inventors: Alexander Medvinsky, San Diego, CA (US); Tat Keung Chan, San Diego, CA (US); Eric J. Sprunk, Carlsbad, CA (US)

(73) Assignee: General Instrument Corporation, Horsham, PA (US)

( * ) Notice: Subject to any disclaimer, the term of this patent is extended or adjusted under 35 U.S.C. 154(b) by 1 day.

(21) Appl. No.: 13/350,072

(22) Filed: Jan. 13, 2012

(65) Prior Publication Data

US 2013/0185551 A1    Jul. 18, 2013

(51) Int. Cl.
*H04L 9/00*    (2006.01)

(52) U.S. Cl.
USPC .............................. 713/155; 713/156; 713/158

(58) Field of Classification Search
USPC ................. 713/150, 155–158, 168–171, 181; 726/2–4, 7
See application file for complete search history.

(56) References Cited

U.S. PATENT DOCUMENTS

| 7,100,044 B2 * | 8/2006 | Watanabe et al. ............. 713/156 |
| 7,392,387 B2 * | 6/2008 | Balfanz et al. ................ 713/168 |
| 7,831,831 B2 * | 11/2010 | Ohmori et al. ................ 713/175 |
| 2006/0251256 A1 | 11/2006 | Asokan et al. | |
| 2007/0199075 A1 | 8/2007 | Skoric et al. | |
| 2011/0264911 A1 | 10/2011 | Hayashi et al. | |

FOREIGN PATENT DOCUMENTS

| WO | 2005/091554 A1 | 9/2005 |
| WO | 2006/106393 A2 | 10/2006 |

OTHER PUBLICATIONS

PCT Search Report & Written Opinion, RE: Application #PCT/US2013/020971; Apr. 17, 2013.

* cited by examiner

*Primary Examiner* — Hosuk Song
(74) *Attorney, Agent, or Firm* — Thomas A. Ward (57) ABSTRACT

In one embodiment, a method includes receiving a revocation request for revoking a model type of a device. A first computing device determines a list of device unit identifiers (UIDs) that are associated with the model type from a database. The device UIDs are for devices of the model type manufactured by a first entity. The method adds the list of device UIDs to a device revocation list and outputs the device revocation list to revoke a validity of secure information associated with devices associated with the list of device UIDs.

12 Claims, 5 Drawing Sheets

REVOCATION LIST UPDATE FOR DEVICES

BACKGROUND

Particular embodiments generally relate to cryptography.

Digital terminal adapter (DTA) devices may be used in networks, such as cable networks. A DTA device may be a device that converts a digital signal to another form, such as an analog signal. A computer chip that is installed in the DTA device may include a security mechanism, such as encryption keys. The keys are used to when communicating with network devices. For example, a cable head end may send content to the DTA devices using a multi-layer security scheme that may be based on public key infrastructure (PKI) technology or symmetric key cryptography, or a combination thereof.

A black box may refer to a cryptographic key server that is installed at a chip foundry for provisioning cryptographic keys to be programmed onto the chips. A black box vendor refers to a vendor that provides a black box. In general, a black box vendor may be different from a device manufacturer. However, a device manufacturer may also be a black box vendor. For example, the DTA devices may be manufactured by a black box vendor. The DTA devices are associated with a model type. For example, a model type is associated with a specific type of computer chip. Multiple DTA devices of the model type may be manufactured. Each DTA device includes the same type of computer chip. At some point, a device model type may become compromised due to hardware or software vulnerability. In this case, a very large group of devices of the same model type may need to have their keys revoked. Typically, it is unlikely that a specific device or small group of devices becomes compromised. In other examples, digital certificates may be installed in the computer chip and digital certificates can be revoked.

A certificate hierarchy may be used to revoke devices for a model type. An authorization certificate authority (CA) for each model type may be defined. Devices are then associated with individual device certificates that are chained to the CA certificate. Thus, whenever the CA certificate is revoked, that automatically revokes all the device certificates under that certificate tree for that CA certificate. While this scheme will revoke all individual device certificates, this solution needs to maintain a different CA for each device model type. This complicates the provisioning of the certificates at a manufacturing facility because the manufacturing facility needs to maintain and track all the different certificate authorities. Also, in cases where the security system is symmetric key based rather than PKI-based, this approach cannot be used.

SUMMARY

In one embodiment, a method includes receiving a revocation request for revoking a model type of a device. A first computing device determines a list of device unit identifiers (UIDs) that are associated with the model type from a database. The device UIDs are for devices of the model type manufactured by a first entity. The method adds the list of device UIDs to a device revocation list and outputs the device revocation list to revoke a validity of secure information associated with devices associated with the list of device UIDs.

In another embodiment, a non-transitory computer-readable storage medium is provided containing instructions for controlling a computer system to be operable to: receive a revocation request for revoking a model type of a device; determine, at a first computing device, a list of device unit identifiers (UIDs) that are associated with the model type from a database, the device UIDs for devices of the model type manufactured by a first entity; add the list of device UIDs to a device revocation list; and output the device revocation list to revoke a validity of secure information associated with devices associated with the list of device UIDs.

In another embodiment, an apparatus is provided comprising: one or more computer processors; and a computer-readable storage medium comprising instructions for controlling the one or more computer processors to be operable to: receive a revocation request for revoking a model type of a device; determine a list of device unit identifiers (UIDs) that are associated with the model type from a database, the device UIDs for devices of the model type manufactured by an entity; add the list of device UIDs to a device revocation list; and output the device revocation list to revoke a validity of secure information associated with devices associated with the list of device UIDs.

The following detailed description and accompanying drawings provide a more detailed understanding of the nature and advantages of the present invention.

DETAILED DESCRIPTION

Described herein are techniques for a security synchronization system. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
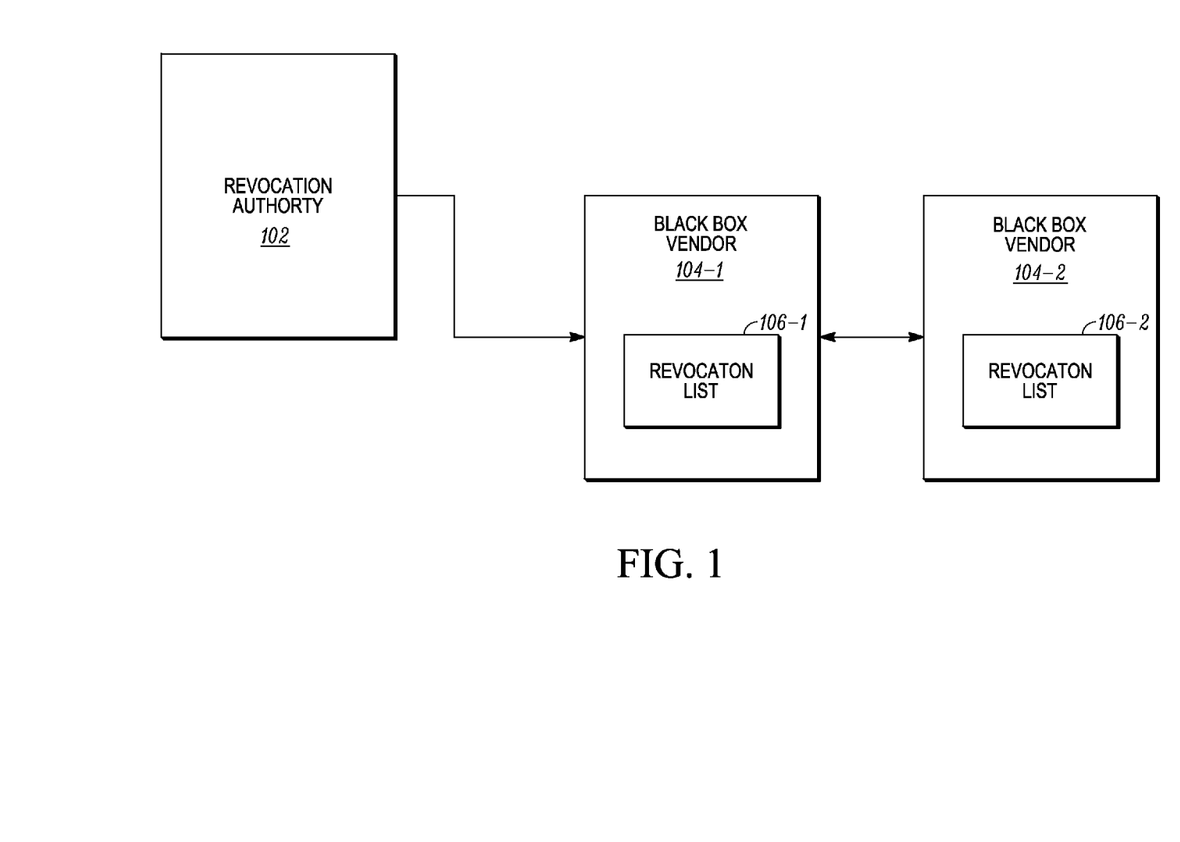
FIG. 1 depicts a simplified system for synchronizing and revoking security information according to one embodiment.

FIG. 1 depicts a simplified system 100 for synchronizing and revoking security information according to one embodiment. System 100 includes a revocation authority 102, a black box vendor 104-1 (BBV1), and a black box vendor 104-2 (BBV2).

A black box vendor may refer to a company that offers black box services to system on a chip (SOC) vendors. For example, black box vendors may provide a black box, which is a server that provides keys in a chip foundry for programming to chips such as SOCs. A device manufacturer may manufacture a device that has a SOC embedded in a device factory. In one embodiment, a device that makes use of a SOC may be a network device, such as a digital terminal adapter (DTA) device, a set-top box, or another device used in content delivery systems, such as cable systems. In one example, the device receives content from a content provider, and converts the content to another form for display. The device will be referred to as a DTA device hereinafter, but other devices may be used.

The SOC may be a computer chip used in the DTA device. Each DTA device may include a unit identifier (UID). In one embodiment, the DTA UID differentiates each DTA device from all others, and may be a 48-bit unique ID. The SOC also includes security functionality and other security related information. The security information may include public or symmetric keys, and/or certificates. Other forms of cryptography may also be used. In one example, a secure key may be a DTA USK (unique secret key) that is unique to each DTA device. In one embodiment, the DTA USK is a 128-bit cryptographic key that is random and uniquely assigned to each DTA device, and is solely associated with a specific DTA device UID.

The device UID is associated with a key and optionally a digital certificate that are installed in each device and/or SOC. For example, the key may be installed in the SOC. Each black box vendor 104 may keep track of which device UIDs are associated with each device model type at the time when devices and/or SOCs are provisioned in a manufacturing facility.

Black box vendors 104 include a revocation list manager 106 that keeps track of UIDs corresponding to DTAs that had the corresponding USKs compromised and should be denied service. Each revocation list manager 106 at each black box vendor 1004 may maintain a DTA UID list.

Revocation authority 102 may be a vendor that is designated as being certified to provide an RA revocation list to black box vendor 104-1 and black box vendor 104-2. The RA revocation list is used by black box vendors 104 to revoke keys that have been compromised. The RA revocation list includes a list of one or more model types, but not a list of actual DTA UIDs for the DTA devices that were manufactured for the model type. For example, different device manufacturers may manufacture DTA devices. The DTA devices may be categorized by a model type. For example, different model types may be defined by which SOC is included in the DTA device. For example, a model type #10 may include SOC #1 and a model type #20 may include SOC #2. Also, different companies may manufacture the same model type of DTA device by including the same SOC in the DTA device.

When black box vendors 104 receive the RA revocation list, revocation list managers 106 perform a process to revoke the keys for individual DTA devices. In a process that is described in more detail below, black box vendors 104-1 and 104-2 synchronize security information by including DTA device UIDs for the model type on a new DTA revocation list. The DTA revocation list includes DTA device UIDs that correspond to the model type specified on the RA revocation list. The DTA revocation list is then made available for download or sent to networking devices, such as a head-end device that is communicating with the DTA devices. The head-end device can revoke the validity of the keys for the DTA devices on the DTA revocation list. For example, the head-end device may not allow any communication from the DTA devices that include the DTA device UIDs found on the revocation list. Other security actions may also be performed. Accordingly, revocation list managers 106 receive a model type and convert the model type into specific device UIDs for use in revoking the security information in the specific DTA devices associated with the device UIDs.

Figure 2:
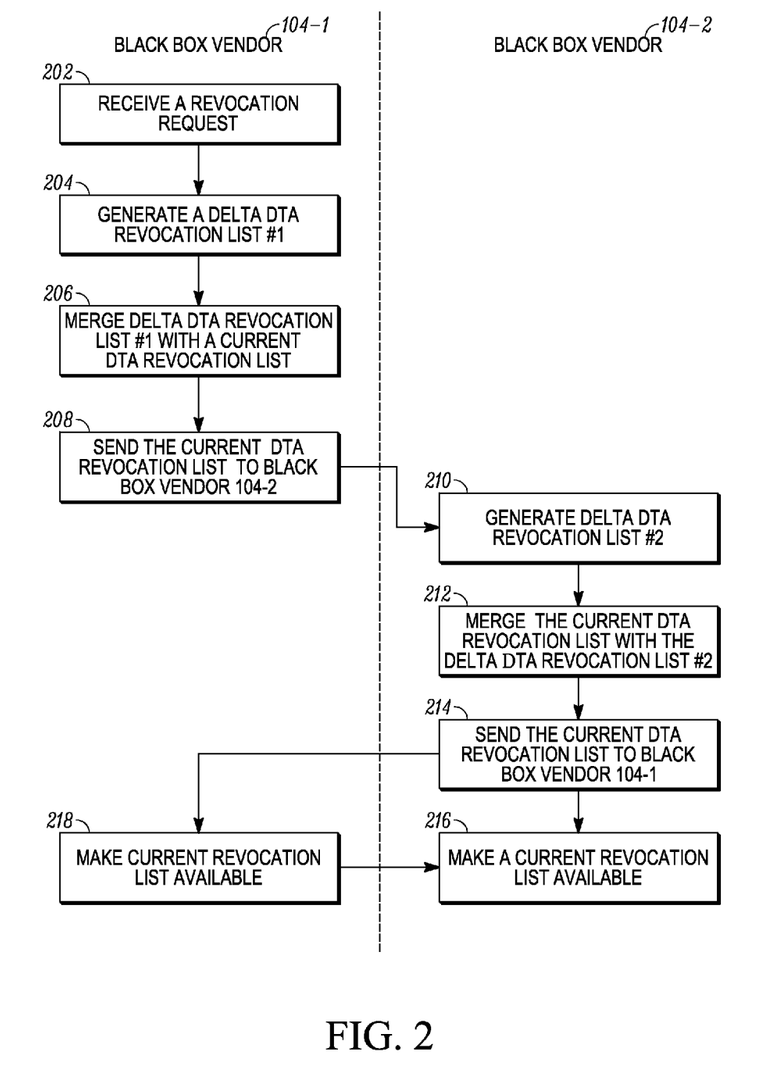
FIG. 2 depicts a simplified flowchart of a method for revoking security information according to one embodiment.

FIG. 2 depicts a simplified flowchart 200 of a method for revoking security information according to one embodiment. A more detailed example of the method will be described below. At 202, black box vendor 104-1 receives a revocation request including an RA revocation list that includes a model type from revocation authority 102. In one embodiment, a single black box vendor 104 may receive the revocation request. That black box vendor 104 may communicate with other black box vendors 104 to synchronize the DTA revocation list for each. In alternative embodiments, each black box vendor 104 may receive the RA revocation request.

At 204, black box vendor 104-1 generates a delta DTA revocation list #1. The delta DTA revocation list includes device UIDs that are associated with the model type received in the revocation request. For example, revocation list manager 106-1 may use a DTA key list to determine which DTA UIDs are associated with the model type.

At 206, revocation list manager 106-1 merges the delta DTA revocation list #1 with a current DTA revocation list. The current DTA revocation list may be a list that includes any DTA UIDs that were previously revoked. By merging the delta DTA revocation list #1 with the current DTA revocation list, any DTA UIDs that are not included on the current DTA revocation list are added to the current DTA revocation list.

At 208, revocation list manager 106-1 sends the current DTA revocation list to black box vendor 104-2. In other examples, just the delta revocation list #1 may be sent, the current revocation list including the delta revocation list #1 may be sent, or any other indication of the changes may be sent. Certain verification steps may be taken to verify the changes to the current DTA revocation list are valid, but are described in more detail below. At 210, revocation list manager 106-2 generates a delta DTA revocation list #2. Because black box vendor 104-2 may be associated with a device manufacture different from black box vender 104-1, black box vendor 104-2 may have provided keys in SOCs in DTA devices of the same model type with different device UIDs. Delta DTA revocation list #2 includes these device UIDs.

At 212, revocation list manager 106-2 merges the current DTA revocation list with the delta DTA revocation list #2. Different ways of creating the current DTA revocation list may be used. For example, revocation list manager 106-2 may receive delta revocation list #1, generate its own current revocation list, and then add both the delta revocation list #1 and #2 to its own current revocation list. This adds any device UIDs that were not on the current DTA revocation list. The current DTA revocation list now includes the merged device UIDs from the delta DTA revocation lists #1 and #2.

At 214, revocation list manager 106-2 sends the current DTA revocation list to black box vendor 104-1. In other examples, just the delta revocation list #2 may be sent. Certain verification steps may be taken to verify the changes to the current DTA revocation list is valid, but are described in more detail below. At this point, both revocation list manager 106-1 and/or revocation list manager 106-2 have the current DTA revocation list that can be deemed official.

At 216, revocation list manager 106-1 and/or revocation list manager 106-2 makes the current DTA revocation list available. For example, the current DTA revocation list is made available for download or the current DTA revocation list is sent to a networking device, such as a head-end device. The head-end device would then use the current DTA revocation list to revoke the security information, such as the key, for associated devices having the device UIDs on the current DTA revocation list. Different head-end devices may use conditional access systems, which use the USK keys to monitor access to each DTA device. Revocation list manager 106-1 may be associated with a Conditional Access System #1 and may supply the current DTA revocation list only to head-end devices that utilize Conditional Access System #1. Revocation list manager 106-2 may be associated with a Conditional Access System #2 and may supply the current DTA revocation list only to head-end devices that utilize Conditional Access System #2.

Figures 3, 3A:
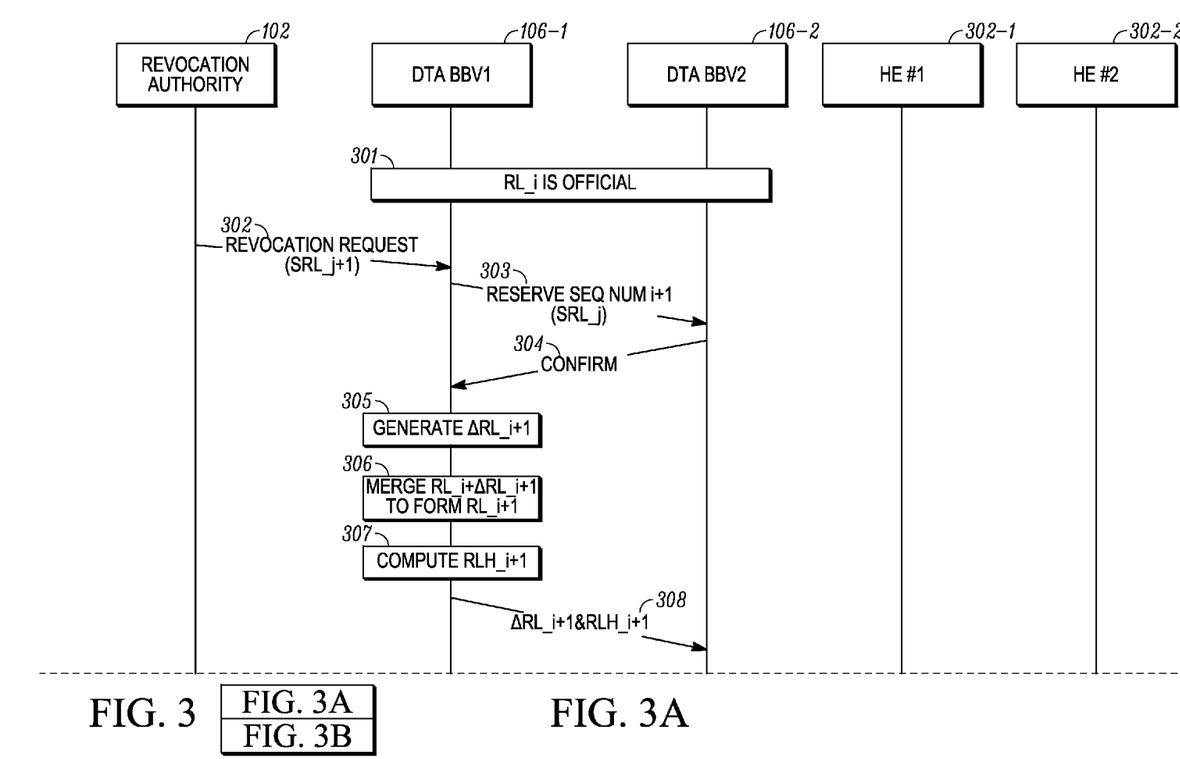
FIG. 3 shows a more detailed example for synchronizing DTA revocation lists according to one embodiment.
Figure 3B:
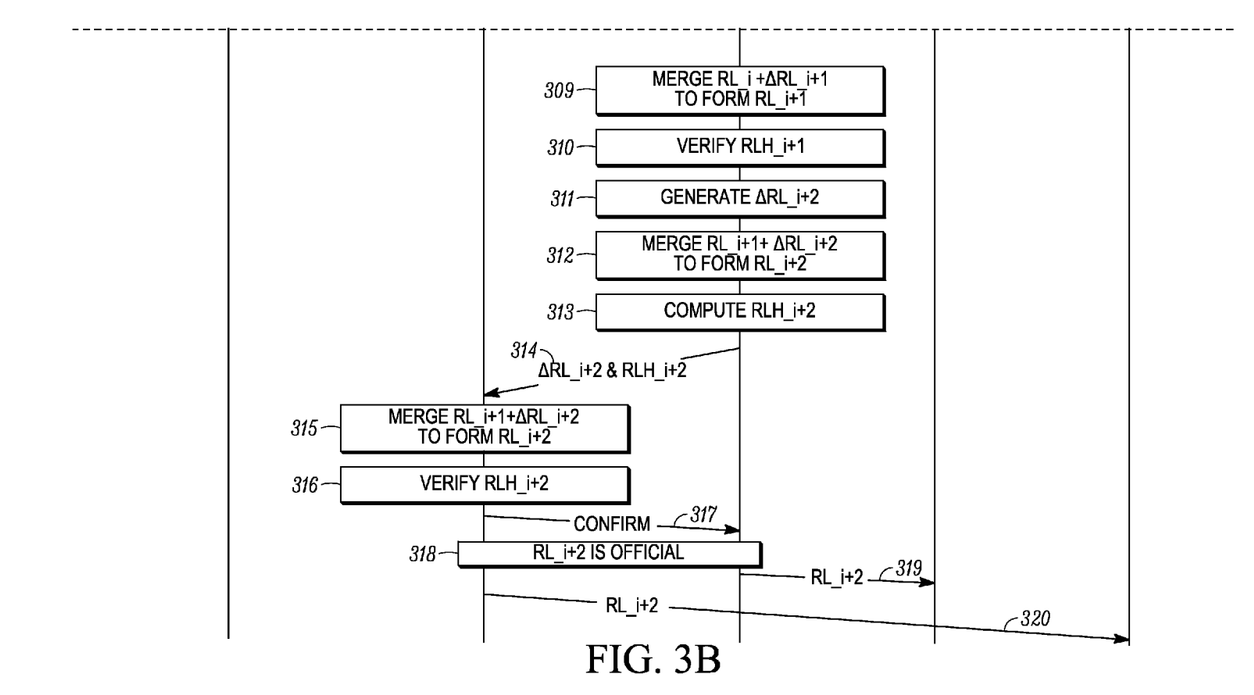

FIG. 3 shows a more detailed example for synchronizing DTA revocation lists according to one embodiment. The communication is between revocation authority 102, black box vendor 104-1, black box vendor 104-2, head-end #1 and head-end #2. At 301, a current DTA revocation list (RL_i) is the official current revocation list. For example, after a synchronization process is performed, DTA revocation list (RL_i), where "i" may be an integer, is the current DTA revocation list. An initial DTA revocation list RL_0 may be an empty list and each synchronized current DTA revocation list may increment "i". At any point in time during a synchronization process, if a third party (e.g., head-end 302) requests a current DTA revocation list from one of black box vendors 104, the current official DTA revocation list is returned to the requester. If a third party requests the current DTA revocation list during a synchronization process, black box vendor 104 asks the third party to wait until the current synchronization is completed. The current DTA revocation list may be made available for retrieval by authorized parties at one or more servers or may be pushed to each head-end 302.

At 302, black box vendor 104-1 receives a revocation request (SRL_j). For example, revocation authority 102 may decide that a certain model type, such as a model type defined by an SOC chip model, should be revoked due to a security breach. The chip model may be identified by an SOC major model and an SOC minor model pair. The SOC major model defines an "SOC key ladder" type that is used by the SOC vendor. This may be SOC-vendor specific. For each SOC major model, there may be one or more "SOC minor models" that specify the particular SOC chip type or version. Different SOC minor models may have (slightly) different security architectures. The SOC minor model may be used during revocation such that revocation authority 102 may request that all DTA devices based on a particular SOC minor model be added to the DTA revocation list. In other examples, a SOC major model may be specified to revoke all SOC minor models associated with the SOC major model.

At 303, black box vendor 104-1 needs to notify black box vendor 104-2 that a synchronization process is going to be performed. For example, black box vendor 104-1 sends a reservation request to black box vendor 104-2 to reserve the next sequence number (i+1) for the revocation request (SRL_j). Reserving the next sequence number ensures that black box vendor 104-2 will not update the current DTA revocation list separately. At 304, black box vendor 104-2 confirms the receipt of the reservation request.

At 305, black box vendor 104-1 generates a delta DTA revocation list ($\Delta$RL_i+1). The delta DTA revocation list contains the DTA UIDs that black box vendor 104-1 generates based on the model type (e.g., SOC major model, SOC minor model) being revoked. To determine the new entries of the DTA UIDs being revoked for this request, black box vendor 104-1 may compare the new DTA revocation list (SRL_j+1) with the previous revocation request (SRL_j). This determines the model types that need to be revoked. Then, the DTA UIDs associated with the model types are determined for the delta DTA revocation list.

At 306, black box vendor 104-1 merges the delta DTA revocation list ($\Delta$RL_i+1) with the current DTA revocation list (RL_i) to form a new DTA revocation list (RL_i+1). The new DTA revocation list includes the previously revoked DTA UIDs and the newly added DTA device UIDs.

At 307, black box vendor 104-1 computes a hash (RLH_i+1) over the new DTA revocation list (RL_i+1). Although hashing is described, a hash over the new DTA revocation list does not need to be performed. The hash may be used to securely communicate the new DTA revocation list to black box vendor 104-2 and also reduce the amount of information that needs to be transmitted. At 308, black box vendor 104-1 sends synchronization data, such as the hash of the DTA revocation list (RLH_i+1) and the delta DTA revocation list ($\Delta$RL i+1), to black box vendor 104-2.

At 309, black box vendor 104-2 merges the delta DTA revocation list with its own current DTA revocation list (RL_i) to form a new DTA revocation list (RL_i+1).

At 310, black box vendor 104-2 computes the hash of the new DTA revocation list (RL_i+1) to form the hash of the DTA revocation list (RLH_i+1) and verifies that the hash of the DTA revocation list is the same as the hash of the DTA revocation list received from black box vendor 104-1. This step is done in order to verify that black box vendor 104-2 has the same current DTA revocation list as black box vendor 104-1. Although this verification is described, it may not be performed in other embodiments.

At 311, black box vendor 104-2 generates a second delta DTA revocation list ($\Delta$RL_i+2). The second delta DTA revocation list includes DTA UIDs that black box vendor 104-2 generates based on the model type (e.g., SOC major model, SOC minor model) being revoked. For example, black box vendor 104-2 may be a different company that manufactures DTA devices that have the same model type as DTA devices from black box vendor 104-1. The DTA devices that were manufactured by black box vendor 106-2 have different device UIDs that black box vendor 106-2 is only aware of. The sequence number for the delta DTA revocation list is also incremented to i+2. If the verification fails, black box vendor 104-2 and black box vendor 104-1 may resolve the discrepancy. This process is not described, however. Before the discrepancy is resolved, the current DTA revocation list (RL_i) remains the official one.

At 312, black box vendor 104-2 merges its delta DTA revocation list ($\Delta$RL_i+2) with the current DTA revocation list received from black box vendor 104-1 (RL_i+1) to form a new current DTA revocation list (RL_i+2).

At 313, black box vendor 104-2 computes the hash of the new current DTA revocation list (RL_i+2) to form a hash of the current revocation list (RLH_i+2). At 314, black box vendor 104-2 sends synchronization data (e.g., its delta revocation list ($\Delta$RL_i+2) and the hash of the current DTA revocation list RLH_i+2) to black box vendor 104-1.

Black box vendor 104-1 may then verify the second DTA revocation list ($\Delta$RL_i+2) from black box vendor 104-2. For example, at 315, black box vendor 104-1 merges its current DTA revocation list (RL_i+1) with the second delta DTA revocation list ($\Delta$RL_i+2) to form a final DTA revocation list (RL_i+2). At 316, black box vendor 104-1 computes the hash of the final DTA revocation list to form the hash of the final DTA revocation list (RLH_i+2), and verifies that the hash is the same as the hash of the final DTA revocation list received in the synchronization data from black box vendor 104-2.

If verification is successful, black box vendor 104-1 sends a confirmation back to black box vendor 104-2 at 317. If verification fails, black box vendor 104-1 and black box vendor 104-2 may work together to resolve the discrepancy. As described above, the current DTA revocation list (RL_i) remains the official one until resolved.

At 318, the new DTA revocation list (RL_i+2) becomes the official DTA revocation list. The official DTA revocation list may be based on a standard, such as X.509 certificate DTA revocation list (CRL) standard and may be processed using public key infrastructure (PKI) implementation. The sequence number has been incremented by two for the single revocation request received from certificate authority 102. Even if a black box vendor 104 does not have any entries to add for a particular request, the sequence number may be incremented.

At 319, black box vendor 104-2 may push the DTA revocation list (RL_i+2) to authorized parties, such as head-end 302-1. Also, at 320, black box vendor 104-1 sends the DTA revocation list (RL_i+2) to head-end 302-2. Black box vendors 104-1 and 104-2 may use different cable networks and thus different head-ends 302 may be contacted with the DTA revocation list. Head-ends 302-1 and 302-2 may be cable head-ends that distribute content to DTA devices. Head-ends 302 may not distribute content to DTA devices that include the DTA UIDs specified on the DTA revocation list. Also, the DTA revocation list may be made available for download.

Figure 4:
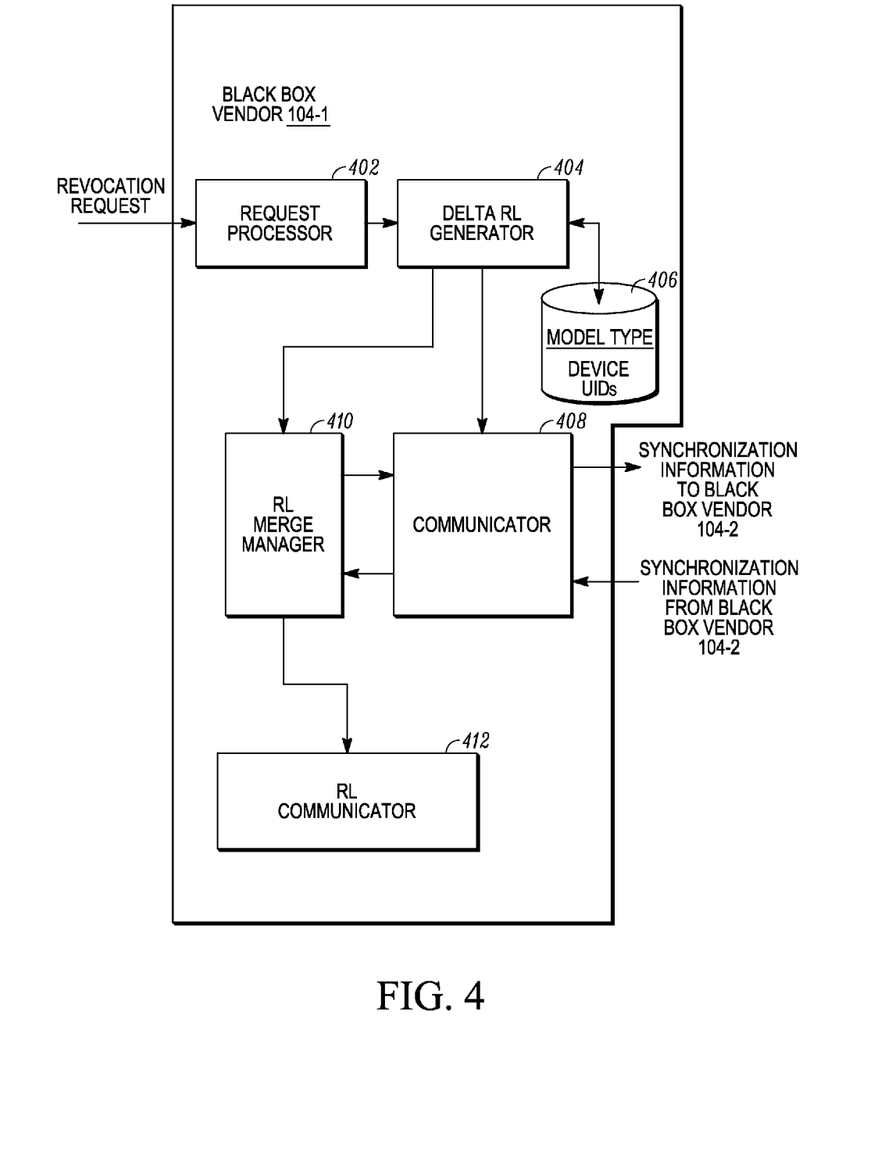
FIG. 4 depicts a more detailed example of a DTA revocation list manager according to one embodiment.

FIG. 4 depicts a more detailed example of DTA revocation list manager 106-1 according to one embodiment. A request processor 402 receives a revocation request from revocation authority 102. Request processor 402 forwards the request to a delta revocation list (RL) generator 404.

Delta RL generator 404 determines a list of device UIDs associated with a model type included with the revocation request. The list of model types and device UIDs may be stored in a database 406 that is queried. Delta RL generator 404 then generates a delta DTA revocation list that includes device UIDs that correspond to new device model(s) that have been revoked.

An RL merge manager 410 may have the current revocation list and merges the current DTA revocation list with the delta DTA revocation list. The merged list is sent to a communicator 408, which is then configured to communicate synchronization information from black box vendor 104-1 to black box vendor 104-2. As described above, the synchronization information may be the delta DTA revocation list and a hash of the merged DTA revocation lists. However, other synchronization information may be sent to allow DTA revocation lists to be synchronized. For example, only the delta DTA revocation list may be sent.

Black box vendor 104-2 may determine its own delta revocation list as described above and send synchronization information back to black box vendor 104-1. Communicator 408 of black box vendor 104-1 receives synchronization information from black box vendor 104-2. For example, a second delta DTA revocation list and a hash of a final DTA revocation list may be received. RL merge manager 410 may then verify the final DTA revocation list as described above. For example, the second delta DTA revocation list may be merged with the current DTA revocation list of black box vendor 104-1 to form the final DTA revocation list, which is then verified with the hash of the final DTA revocation list received from second black box vendor 104-2. RL merge manager 410 then outputs the official DTA revocation list to a DTA revocation list communicator 412. DTA revocation list (RL) communicator 412 can then provide the official DTA revocation list to one or more servers for download or push the official DTA revocation list to other authorized parties.

Accordingly, particular embodiments provide a method to take revocation requests using model types and determine device UIDs in which to revoke security information. The method also allows for synchronization between multiple black box vendors 104. This provides protection when a particular model type has software or hardware vulnerability. It may be rare when one specific device or a small set of devices have their security information revoked. Particular embodiments allow for a very large group of devices of the same model type to be revoked at the same time.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
receiving a revocation request for revoking a model type of a device;
determining, by a first computing device, a list of device unit identifiers (UIDs) that are associated with the model type from a database, the device UIDs for devices of the model type manufactured by a first entity;
adding the list of device UIDs to a device revocation list; and
outputting the device revocation list to revoke a validity of secure information associated with devices associated with the list of device UIDs;
sending the list of device UIDs from the first computing device to a second computing device, wherein the second computing device outputs the device revocation list to revoke the validity of secure information associated with devices associated with the list of device UIDs,
wherein:
the list of device UIDs comprises a first list of device UIDs and the database comprises a first database,
the second computing device determines a second list of device UIDs that are associated with the model identifier from a second database, the device UIDs in the second list of device UIDs for devices of the model type manufactured by a second entity, and
the second computing device adds the second list of device UIDs to the device revocation list.

2. The method of claim 1, further comprising:
receiving, at the first computing device from the second computing device, the device revocation list including the second list of device UIDs; and
outputting the device revocation list including the first list of device UIDs and the second list of device UIDs to revoke the validity of secure information associated with devices associated with the first list of device UIDs and the second list of device UIDs.

3. The method of claim 1, wherein devices manufactured by the first entity in the first list of device UIDs and devices manufactured by the second entity in the second list of device UIDs includes a same chip associated with the model type.

4. The method of claim 3, wherein devices manufactured by the first entity are associated with a first conditional access system managing access to the devices manufactured by the first entity using a secret key identifier included the chip of each device and devices manufactured by the second entity are associated with a second conditional access system managing access to the devices manufactured by the second entity using a secret key identifier included the chip of each device.

5. A method comprising:
receiving a revocation request for revoking a model type of a device;
determining, by a first computing device, a list of device unit identifiers (UIDs) that are associated with the model type from a database, the device UIDs for devices of the model type manufactured by a first entity;
adding the list of device UIDs to a device revocation list; and
outputting the device revocation list to revoke a validity of secure information associated with devices associated with the list of device UIDs;
wherein the list of device UIDs is a delta list of device UIDs and the delta list of device UIDs is a merged with the device revocation list to form a first merged device revocation list, the method further comprising:
computing a hash of the first merged device revocation list; and
sending, from the first computing device to a second computing device, the hash of the first merged device revocation list and the delta list of device UIDs, wherein the second computing device merges its version of the device revocation list with the delta list of device UIDs and verifies the merging using the hash of the first merged device revocation list.

6. The method of claim 5, wherein the second computing device determines a second delta list of device UIDs, merges the second delta list of device UIDs with the first merged device revocation list to form a second merged device revocation list, and computes a hash of the second merged device revocation list, the method further comprising:
receiving the hash of the second merged device revocation list at the first computing device and the second delta list of device UIDs;
merging the second delta list of device UIDs with the first merged device revocation list; and
verifying the merging of the second delta list of device UIDs using the hash of the second merged device revocation list.

7. A non-transitory computer-readable storage medium of containing instructions for controlling a computer system to be operable to:
receive a revocation request for revoking a model type of a device;
determine, at a first computing device, a list of device unit identifiers (UIDs) that are associated with the model type from a database, the device UIDs for devices of the model type manufactured by a first entity;
add the list of device UIDs to a device revocation list;
output the device revocation list to revoke a validity of secure information associated with devices associated with the list of device UIDs; and
send the list of device UIDs from the first computing device to a second computing device, wherein the second computing device outputs the device revocation list to revoke the validity of secure information associated with devices associated with the list of device UIDs,
wherein:
the list of device UIDs comprises a first list of device UIDs and the database comprises a first database,
the second computing device determines a second list of device UIDs that are associated with the model identifier from a second database, the device UIDs in the second list of device UIDs for devices of the model type manufactured by a second entity, and
the second computing device adds the second list of device UIDs to the device revocation list.

8. The non-transitory computer-readable storage medium of claim 7, further operable to:
receive, at the first computing device from the second computing device, the device revocation list including the second list of device UIDs; and
output the device revocation list including the first list of device UIDs and the second list of device UIDs to revoke the validity of secure information associated with the devices associated with the first list of device UIDs and the second list of device UIDs.

9. The non-transitory computer-readable storage medium of claim 7, wherein devices manufactured by the first entity in the first list of device UIDs and devices manufactured by the second entity in the second list of device UIDs include a same chip associated with the model type.

10. The non-transitory computer-readable storage medium of claim 9, wherein devices manufactured by the first entity are associated with a first conditional access system managing access to the devices manufactured by the first entity using a secret key identifier included the chip of each device and devices manufactured by the second entity are associated with a second conditional access system managing access to the devices manufactured by the second entity using a secret key identifier included the chip of each device.

11. A non-transitory computer-readable storage medium of containing instructions for controlling a computer system to be operable to:
receive a revocation request for revoking a model type of a device;
determine, at a first computing device, a list of device unit identifiers (UIDs) that are associated with the model type from a database, the device UIDs for devices of the model type manufactured by a first entity;
add the list of device UIDs to a device revocation list;
output the device revocation list to revoke a validity of secure information associated with devices associated with the list of device UIDs,
wherein the list of device UIDs is a delta list of device UIDs and the delta list of device UIDs is merged with the device revocation list to form a first merged device revocation list, further operable to:
compute a hash of the first merged device revocation list; and
send, from the first computing device to a second computing device, the hash of the first merged device revocation list and the delta list of device UIDs, wherein the second computing device merges its version of the device revocation list with the delta list of device UIDs and verifies the merging using the hash of the first merged device revocation list.

12. The non-transitory computer-readable storage medium of claim 11, wherein the second computing device determines a second delta list of device UIDs, merges the second delta list of device UIDs with the first merged device revocation list to form a second merged device revocation list, and computes a hash of the second merged device revocation list, further operable:
receive the hash of the second merged device revocation list at the first computing device and the second delta list of device UIDs;
merge the second delta list of device UIDs with the first merged device revocation list; and verify the merging of the second delta list of device UIDs using the hash of the second merged device revocation list.

* * * * *